US012272885B2

(12) United States Patent
Hwang

(10) Patent No.: US 12,272,885 B2
(45) Date of Patent: Apr. 8, 2025

(54) LIGHTWEIGHT PATCH ANTENNA

(71) Applicant: AMOTECH CO., LTD., Incheon (KR)

(72) Inventor: Chul Hwang, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 266 days.

(21) Appl. No.: 18/013,881

(22) PCT Filed: Jun. 21, 2021

(86) PCT No.: PCT/KR2021/007749
§ 371 (c)(1),
(2) Date: Dec. 29, 2022

(87) PCT Pub. No.: WO2022/005082
PCT Pub. Date: Jan. 6, 2022

(65) Prior Publication Data

US 2023/0299487 A1 Sep. 21, 2023

(30) Foreign Application Priority Data

Jun. 30, 2020 (KR) ........................ 10-2020-0080000

(51) Int. Cl.
*H01Q 9/04* (2006.01)
*H01Q 21/06* (2006.01)

(52) U.S. Cl.
CPC ......... *H01Q 9/0414* (2013.01); *H01Q 21/065* (2013.01)

(58) Field of Classification Search
CPC ...... H01Q 9/0414; H01Q 21/065; H01Q 1/48; H01Q 9/0457; H01Q 9/0407
See application file for complete search history.

(56) References Cited

U.S. PATENT DOCUMENTS

| | | | | |
|---|---|---|---|---|
| 10,923,823 B2 | 2/2021 | Hwang et al. | | |
| 2005/0116862 A1* | 6/2005 | du Toit | ................ | H01Q 9/0414 343/770 |
| 2010/0066631 A1* | 3/2010 | Puzella | ................ | H01Q 9/0414 29/601 |
| 2017/0317402 A1 | 11/2017 | Hwang et al. | | |
| 2019/0020114 A1 | 1/2019 | Paulotto et al. | | |

FOREIGN PATENT DOCUMENTS

| | | |
|---|---|---|
| KR | 10-2005-0043178 A | 5/2005 |
| KR | 10-2007-0016397 A | 2/2007 |
| KR | 10-1779593 B1 | 9/2017 |

OTHER PUBLICATIONS

S. W. Kim, et al., "Design of Koch Curve Microstrip Patch Antenna for Miniaturization Structure," JKIICE, vol. 18, Issue 12, pp. 2823-2830 (Dec. 2014).

KR Office Action dated Aug. 1, 2022 as received in Application No. 1020200080000.

* cited by examiner

*Primary Examiner* — David E Lotter
(74) *Attorney, Agent, or Firm* — Maschoff Brennan

(57) ABSTRACT

Disclosed is a lightweight patch antenna having grooves formed in a dielectric, an upper patch, and a lower patch so as to maintain antenna performance while being lightweight. The disclosed lightweight patch antenna comprises: a dielectric; an upper patch layered on the dielectric; a lower patch layered under the dielectric; and a plurality of lightweight grooves formed by removing a portion of a stack from the outside of the stack in which the dielectric, the upper patch, and the lower patch are stacked.

18 Claims, 10 Drawing Sheets

[FIG. 1]
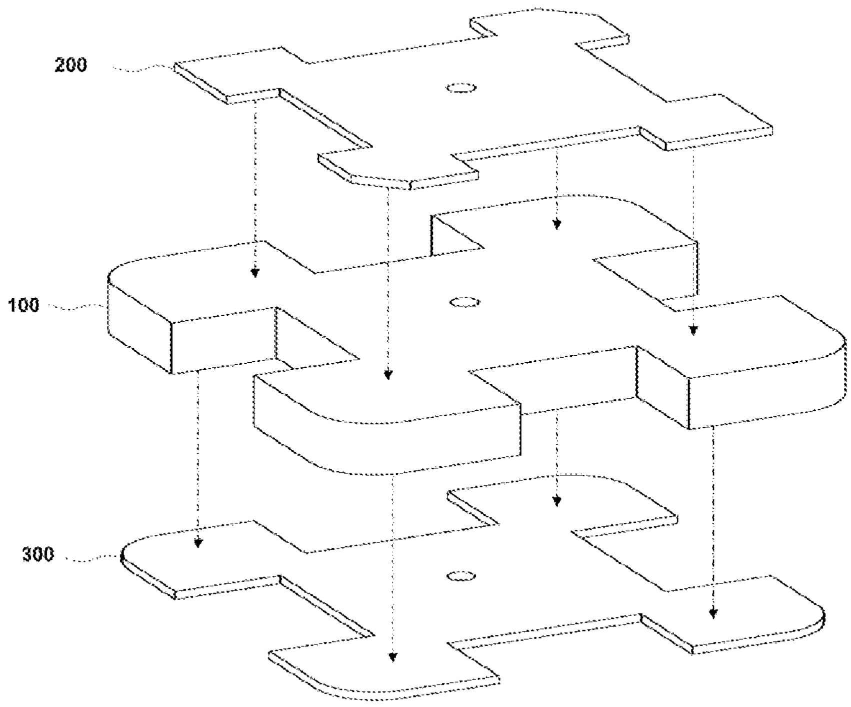
[FIG. 2]
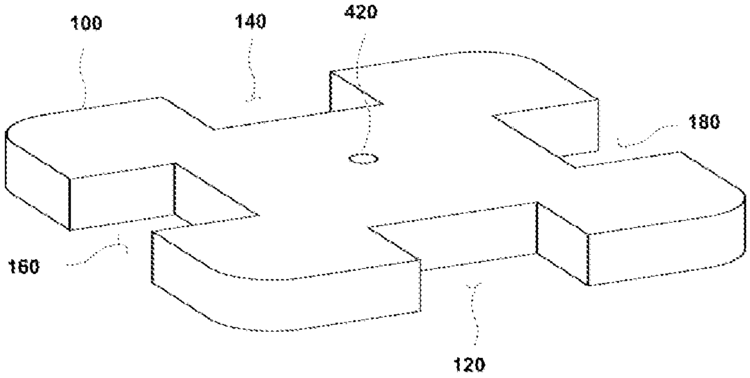

[FIG. 3]
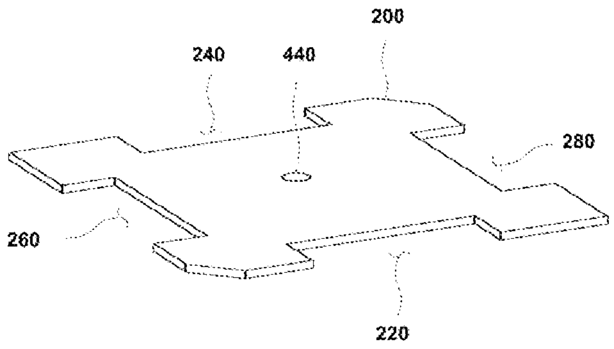
[FIG. 4]
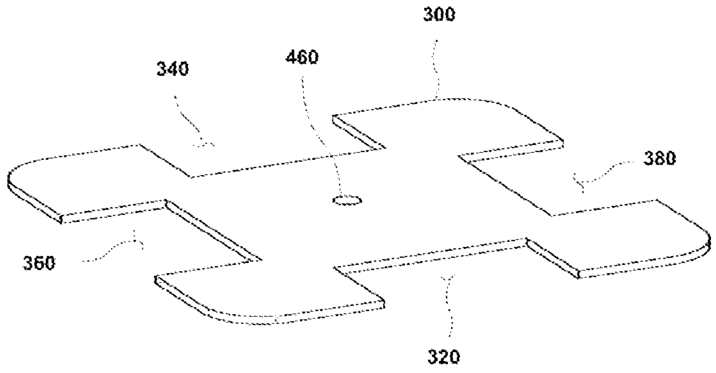
[FIG. 5]
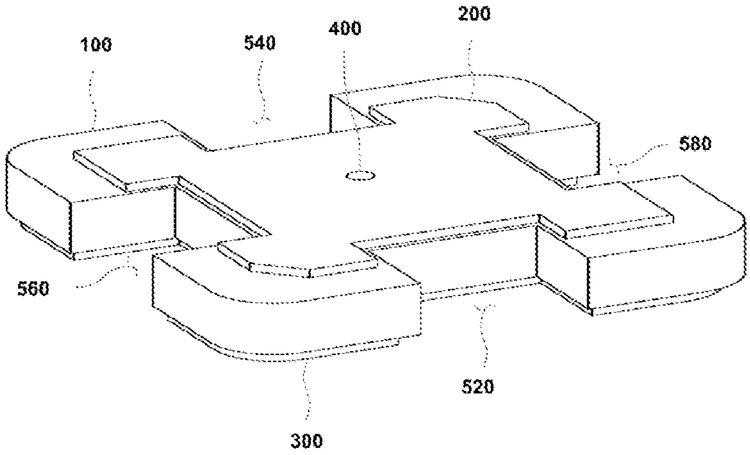

[FIG. 6]
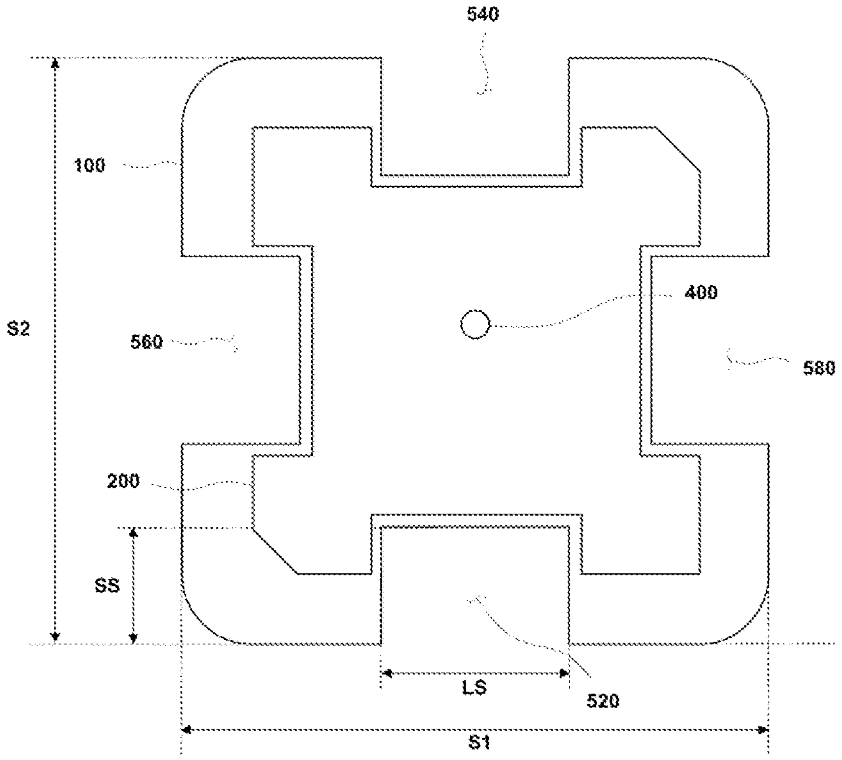

[FIG. 7]
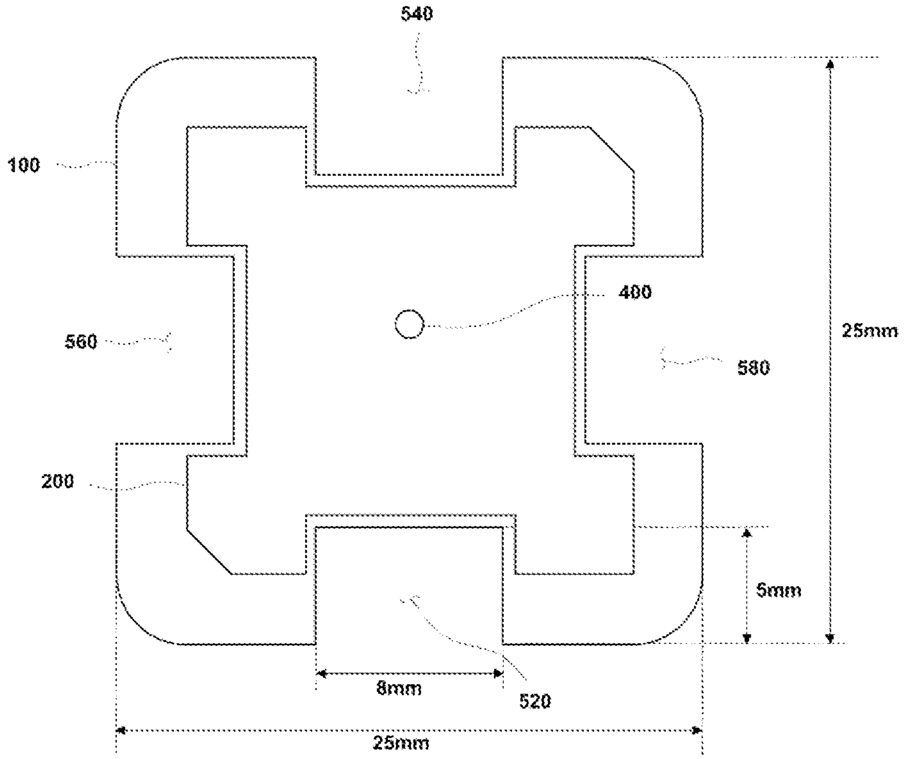
[FIG. 8]
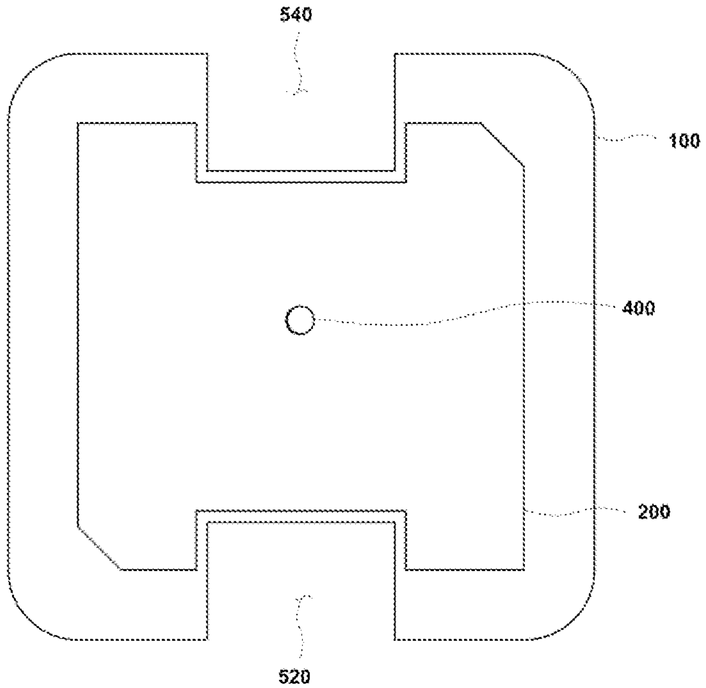

[FIG. 9]
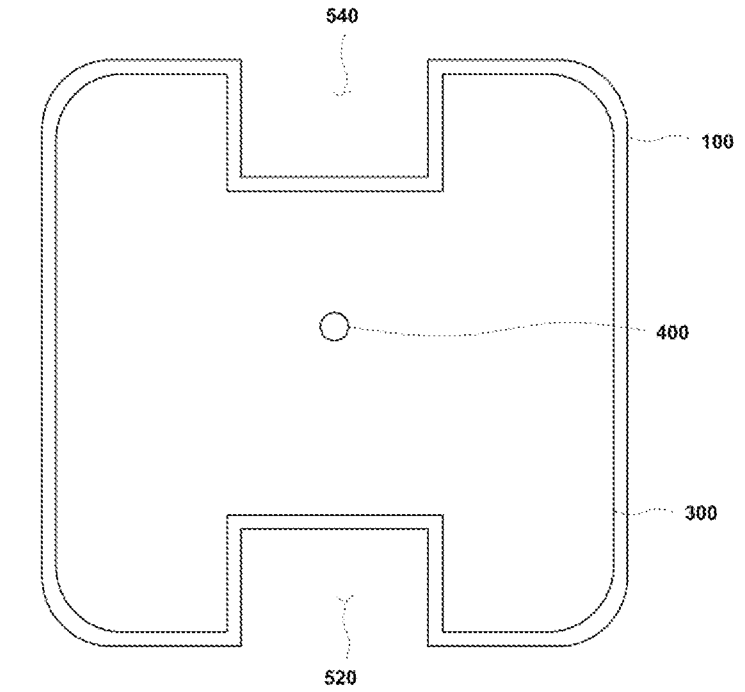
[FIG. 10]
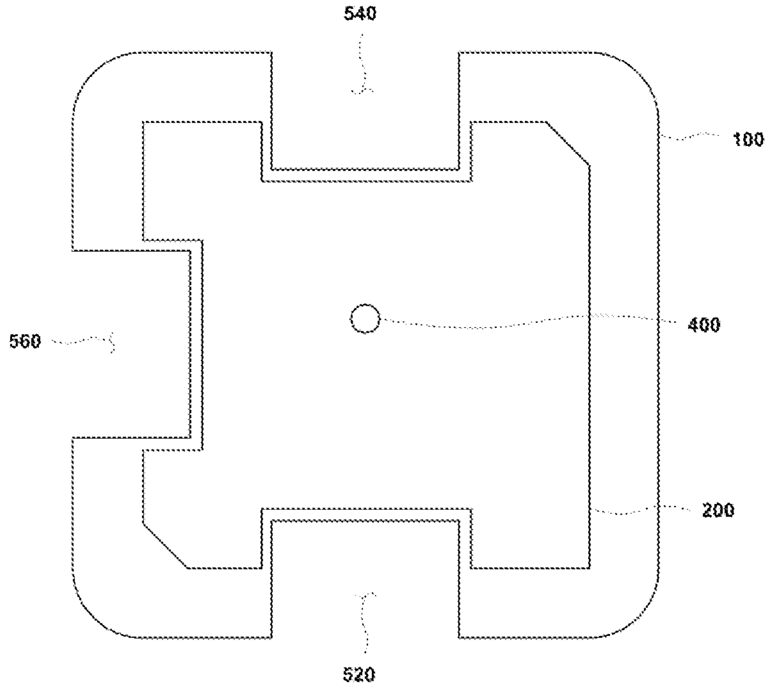

[FIG. 11]
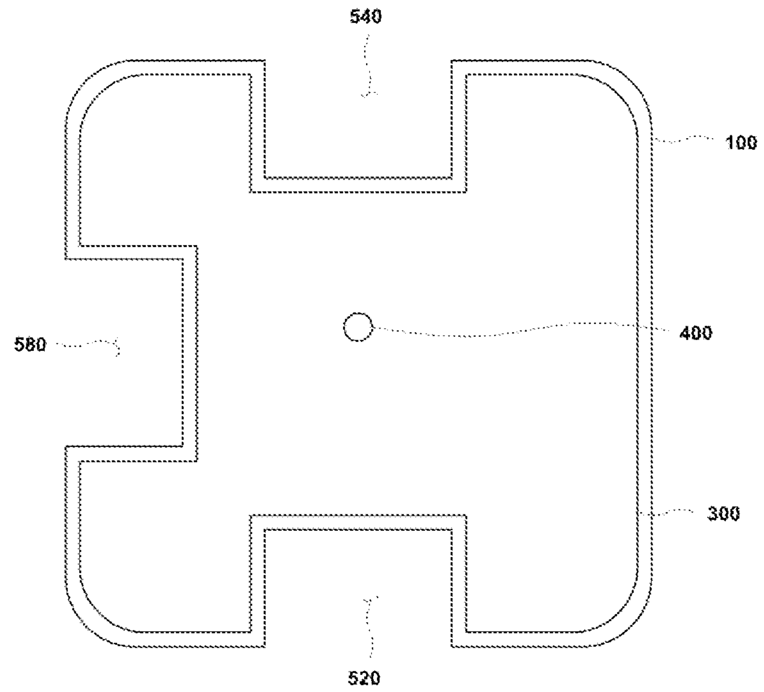
[FIG. 12]
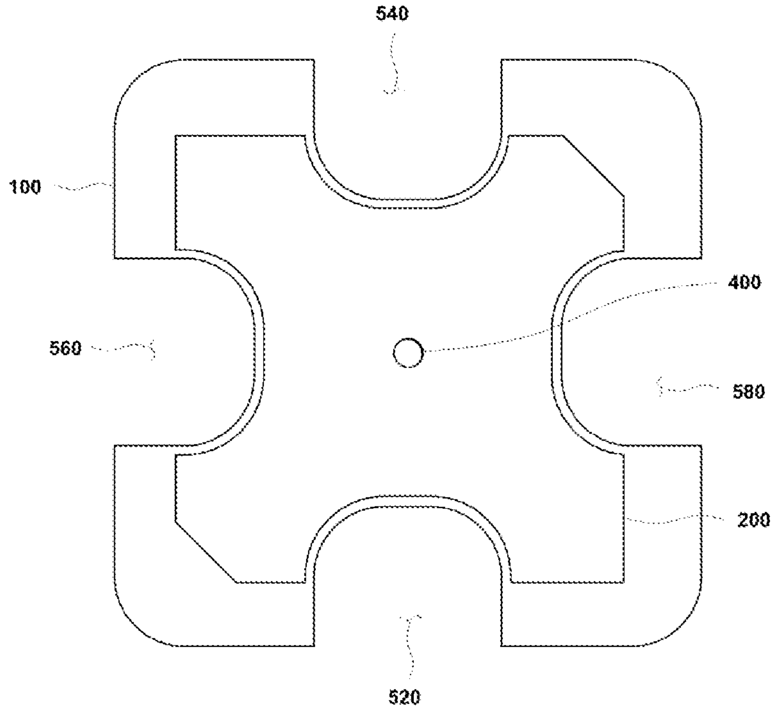

[FIG. 13]
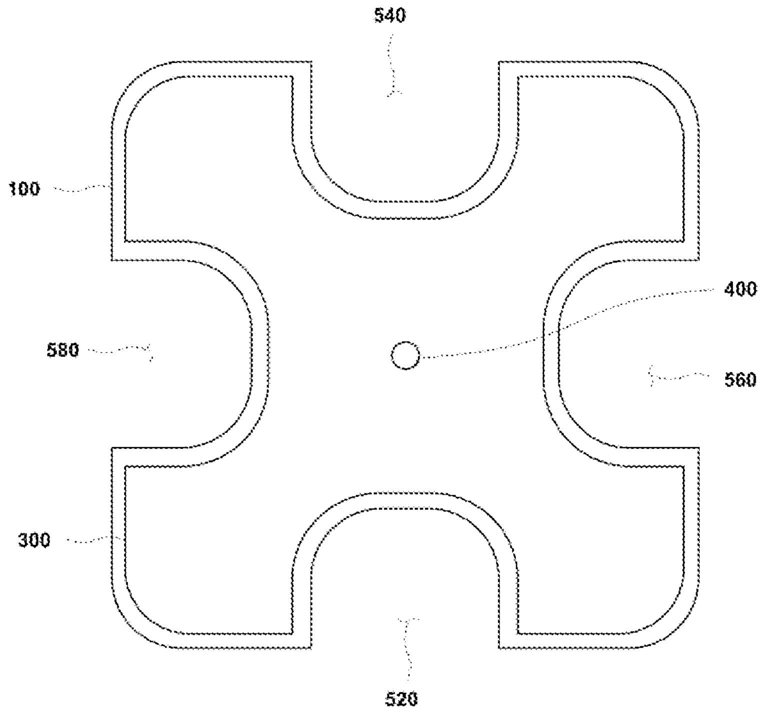
[FIG. 14]
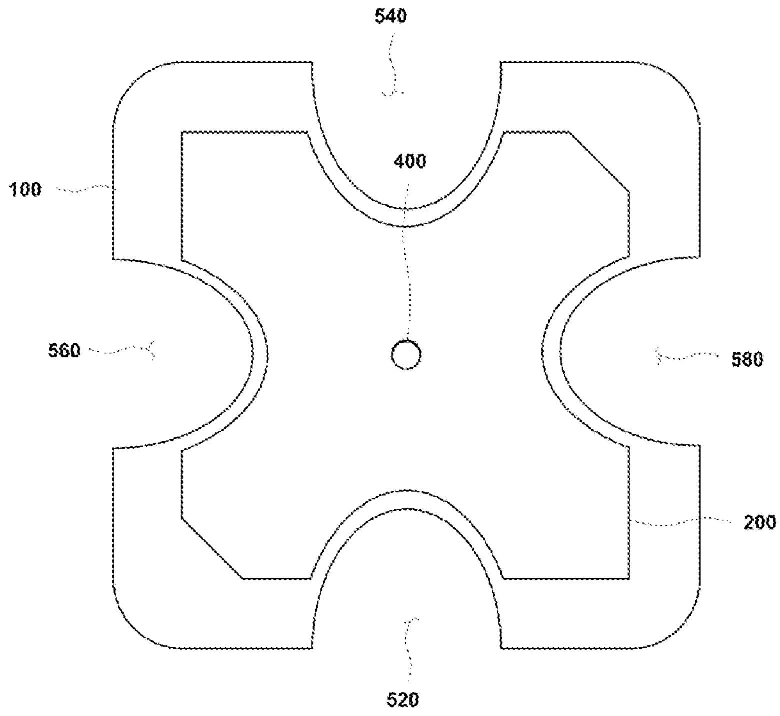

[FIG. 15]
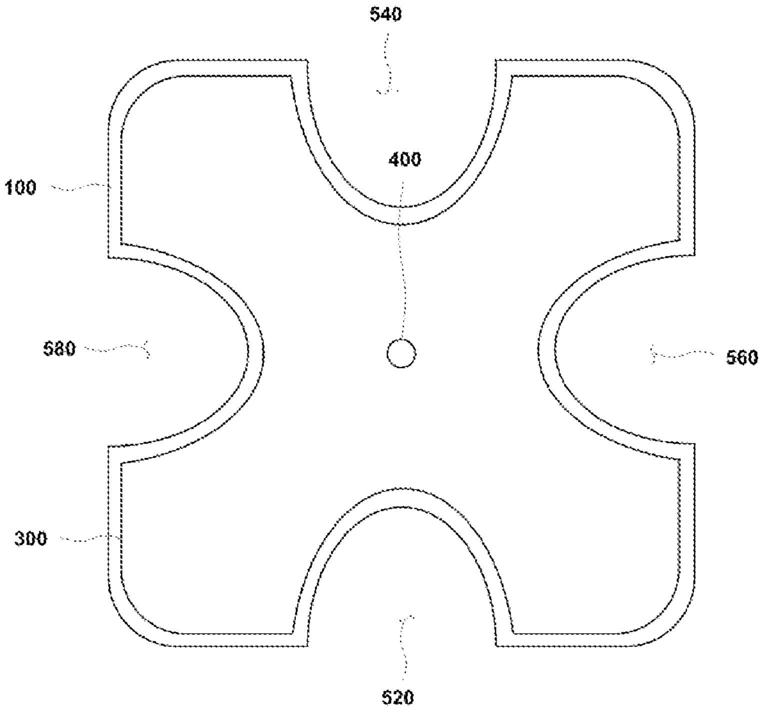
[FIG. 16]
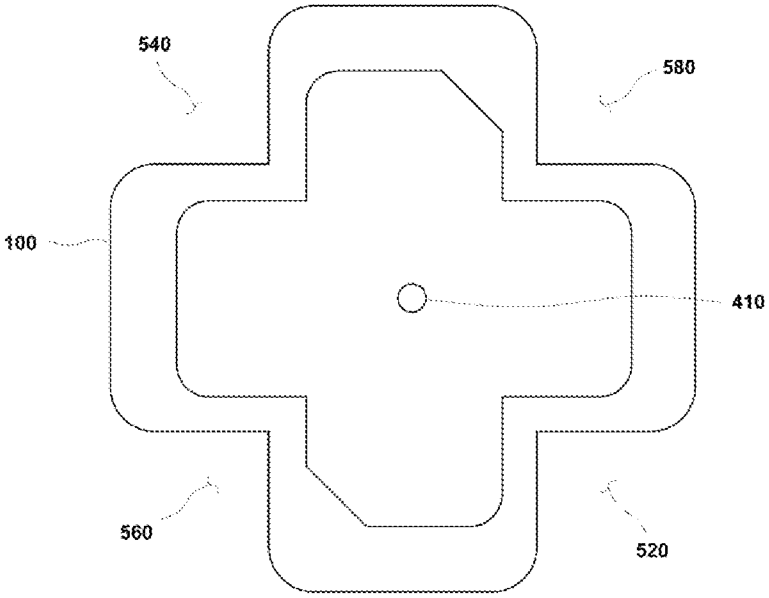

[FIG. 17]
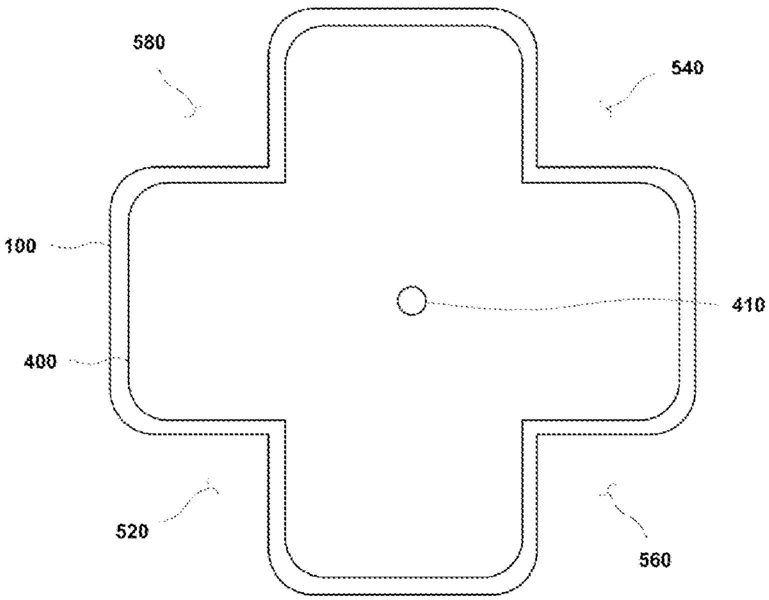

[FIG. 18]

| FREQUENCY [MHz] | RETURN LOSS [dB] | | EFFICIENCY [%] | | AVERAGE GAIN [dBic] | | PEAK GAIN [dBic] | |
|---|---|---|---|---|---|---|---|---|
| | CONVENTIONAL | THE PRESENT INVENTION | CONVENTIONAL | THE PRESENT INVENTION | CONVENTIONAL | THE PRESENT INVENTION | CONVENTIONAL | THE PRESENT INVENTION |
| 1575 | 14.91 | 15.07 | 58.35 | 46.95 | −2.33 | −3.28 | −0.94 | −2.02 |
| 1602 | 20.30 | 18.74 | 61.15 | 49.630 | −2.13 | −3.07 | −0.65 | −1.77 |

LIGHTWEIGHT PATCH ANTENNA

TECHNICAL FIELD

The present disclosure has been proposed to solve the above conventional problems, and an object of the present disclosure is to provide a lightweight patch antenna having grooves formed in a dielectric, an upper patch, and a lower patch so as to maintain antenna performance while being lightweight.

BACKGROUND ART

The present disclosure has been proposed to solve the above conventional problems, and an object of the present disclosure is to provide a lightweight patch antenna having grooves formed in a dielectric, an upper patch, and a lower patch so as to maintain antenna performance while being lightweight.

DISCLOSURE

Technical Problem

An object of the present disclosure is to provide a lightweight patch antenna having grooves formed in a dielectric, an upper patch, and a lower patch so as to maintain antenna performance while being lightweight.

Technical Solution

According to a characteristic of the present disclosure for achieving the object, the present disclosure includes a lightweight patch antenna, including: a dielectric formed with a plurality of dielectric grooves; an upper patch that is disposed on the dielectric and has an upper groove formed at a position overlapping the dielectric groove; and a lower patch that is disposed under the dielectric and has a lower groove formed at a position overlapping the dielectric groove.

According to a characteristic of the present disclosure for achieving the object, the present disclosure includes a lightweight patch antenna, including: a dielectric; an upper patch that is stacked on the dielectric; a lower patch that is stacked under the dielectric; and a plurality of lightweight grooves that are formed by removing a portion of a stack from an outer circumference of the stack in which the dielectric, the upper patch, and the lower patch are stacked. In this case, the lightweight groove may be formed from the outer circumference of the stack toward the center point of the stack.

Advantageous Effects

According to the present disclosure, the lightweight patch antenna has a lightweight groove in the form in which a portion of the antenna is removed by stacking a dielectric, an upper patch, and a lower patch on which a plurality of grooves are formed, thereby realizing antenna performance equal to that of a conventional patch antenna while reducing weight compared to the conventional patch antenna.

In addition, the lightweight patch antenna has an effect of reducing a weight by about 20% to 30% compared to the conventional patch antenna by forming four lightweight grooves opposite to each other with a center point interposed therebetween.

DESCRIPTION OF DRAWINGS

FIG. 1 is a diagram for explaining a configuration of a lightweight patch antenna according to an embodiment of the present disclosure;

FIG. 2 is a diagram for explaining a dielectric of FIG. 1;

FIG. 3 is a diagram for explaining an upper patch of FIG. 1;

FIG. 4 is a diagram for explaining a lower patch of FIG. 1;

FIG. 5 is a diagram for explaining a structure for reducing a weight of a lightweight patch antenna according to an embodiment of the present disclosure;

FIGS. 6 and 7 are diagrams for explaining a lightweight groove of FIG. 5;

FIGS. 8 to 17 are diagrams for explaining another structure for reducing the weight of the lightweight patch antenna according to the embodiment of the present disclosure;

FIG. 18 is a diagram for explaining and comparing the antenna performance of the lightweight patch antenna according to the embodiment of the present disclosure with the conventional patch antenna.

MODE FOR INVENTION

Hereinafter, in order to describe in detail to the extent that those skilled in the art can easily practice the technical idea of the present disclosure, the most preferred embodiments of the present disclosure will be described with reference to the accompanying drawings. First, it is to be noted that in giving reference numerals to components of each of the accompanying drawings, the same components will be denoted by the same reference numerals even though they are illustrated in different drawings. Further, in describing exemplary embodiments of the present disclosure, well-known functions or constructions will not be described in detail since they may unnecessarily obscure the understanding of the present disclosure.

Referring to FIG. 1, a lightweight patch antenna according to an embodiment of the present disclosure is configured to include a dielectric 100, an upper patch 200 on the dielectric 100, and a lower patch 300 disposed under the dielectric 100.

The dielectric 100 is composed of the dielectric 100 having a permittivity or a magnetic material. The dielectric 100 may be composed of a dielectric 100 substrate made of a ceramic having characteristics such as a high permittivity and a low thermal expansion coefficient. The dielectric 100 may be composed of a magnetic material substrate composed of a magnetic material such as ferrite.

Referring to FIG. 2, the dielectric 100 includes a first feed hole 420, a first dielectric groove 120, a second dielectric groove 140, a third dielectric groove 160, and a fourth dielectric groove 180.

The first feed hole 420 is formed to penetrate through the dielectric 100. The first feed hole 420 is formed to penetrate through the dielectric 100 at a position spaced apart from a center point of the dielectric 100 by a predetermined distance.

The first dielectric groove 120 is formed by removing a portion of the dielectric 100. The first dielectric groove 120 has a shape recessed from a first side of the dielectric 100 toward an inside of the dielectric 100 (or toward the center point).

The second dielectric groove 140 is formed by removing a portion of the dielectric 100. The second dielectric groove 140 has a shape recessed from a second side of the dielectric 100 toward the inside of the dielectric 100 (or toward the center point). In this case, the second side is opposite to the first side of the dielectric 100 with the center point of the dielectric 100 interposed therebetween, and the second dielectric groove 140 is disposed opposite to the first dielectric groove 120 with the center point of the dielectric 100 interposed therebetween.

The third dielectric groove 160 is formed by removing a portion of the dielectric 100. The third dielectric groove 160 has a shape recessed from the first side of the dielectric 100 toward the inside of the dielectric 100 (or toward the center point).

The fourth dielectric groove 180 is formed by removing a portion of the dielectric 100. The fourth dielectric groove 180 has a shape recessed from a fourth side of the dielectric 100 toward the inside of the dielectric 100 (or toward the center point). In this case, the fourth side is opposite to a third side of the dielectric 100 with the center point of the dielectric 100 interposed therebetween, and the fourth dielectric groove 180 is disposed opposite to the third dielectric groove 160 with the center point of the dielectric 100 interposed therebetween.

The upper patch 200 is disposed on the dielectric 100. The upper patch 200 is composed of a thin plate made of a conductive material having high electrical conductivity, such as copper, aluminum, gold, or silver.

The lightweight patch antenna includes a feed hole 400 formed to penetrate through the dielectric 100, the upper patch 200, and the lower patch 300. A feed pin (not illustrated) for feeding the upper patch 200 is inserted into the feed hole 400. The upper patch 200 is fed with power through the feed pin (not illustrated) and operates as a radiator that receives a GPS signal, a GLONASS signal, and the like.

Meanwhile, when the lightweight patch antenna has a structure in which the feed hole 400 is not formed, the upper patch 200 may be fed through electromagnetic coupling with a feed point (not illustrated) disposed under the dielectric 100, and may operate as the radiator.

Referring to FIG. 3, the upper patch 200 includes a second feed hole 440, a first upper groove 220, a second upper groove 240, a third upper groove 260, and a fourth upper groove 280.

The second feed hole 440 is formed to penetrate through the upper patch 200. The second feed hole 440 is formed to penetrate through the upper patch 200 at a position spaced apart from a center point of the upper patch 200 by a predetermined distance.

The first upper groove 220 is formed by removing a portion of the upper patch 200. The first upper groove 220 has a shape recessed from the first side of the upper patch 200 toward the inside of the upper patch 200 (or toward the center point).

The second upper groove 240 is formed by removing a portion of the upper patch 200. The second upper groove 240 has a shape recessed from a second side of the upper patch 200 toward the inside of the upper patch 200 (or toward the center point). In this case, the second side is opposite to the first side of the upper patch 200 with the center point of the upper patch 200 interposed therebetween, and the second upper groove 240 is disposed opposite to the first upper groove 220 with the center point of the upper patch 200.

The third upper groove 260 is formed by removing a portion of the upper patch 200. The third upper groove 260 has a shape recessed from the first side of the upper patch 200 toward the inside of the upper patch 200 (or toward the center point).

The fourth upper groove 280 is formed by removing a portion of the upper patch 200. The fourth upper groove 280 has a shape recessed from a fourth side of the upper patch 200 toward the inside of the upper patch 200 (or toward the center point). In this case, the fourth side is opposite to the third side of the upper patch 200 with the center point of the upper patch 200 interposed therebetween, and the fourth upper groove 280 is disposed opposite to the third upper groove 260 with the center point of the upper patch 200 therebetween.

The lower patch 300 is disposed under the dielectric 100. That is, the lower patch 300 is composed of a thin plate made of a conductive material having high electrical conductivity, such as copper, aluminum, gold, or silver. The lower patch 300 is formed to have an area smaller than that of a lower surface of the dielectric 100, but is formed to have a wider area than the upper patch 200. In this case, the lower patch 300 may be formed on the entire lower surface of the dielectric 100 because it is necessary to secure a certain area or more to form the ground.

Referring to FIG. 4, the lower patch 300 includes a third feed hole 460, a first lower groove 320, a second lower groove 340, a third lower groove 360, and a fourth lower groove 380.

The third feed hole 460 is formed to penetrate through the lower patch 300. The third feed hole 460 is formed to penetrate through the lower patch 300 at a position spaced apart from the center point of the lower patch 300 by a predetermined distance.

The first lower groove 320 is formed by removing a portion of the lower patch 300. The first lower groove 320 has a shape recessed from the first side of the lower patch 300 toward the inside of the lower patch 300 (or toward the center point).

The second lower groove 340 is formed by removing a portion of the lower patch 300. The second lower groove 340 has a shape recessed from the second side of the lower patch 300 toward the inside of the lower patch 300 (or toward the center point). In this case, the second side is opposite to the first side of the lower patch 300 with the center point of the lower patch 300 interposed therebetween, and the second lower groove 340 is disposed opposite to the first lower groove 320 with the center point of the lower patch 300.

The third lower groove 360 is formed by removing a portion of the lower patch 300. The third lower groove 360 has a shape recessed from the first side of the lower patch 300 toward the inside of the lower patch 300 (or toward the center point).

The fourth lower groove 380 is formed by removing a portion of the lower patch 300. The fourth lower groove 380 has a shape recessed from the fourth side of the lower patch 300 toward the inside of the lower patch 300 (or toward the center point). In this case, the fourth side is opposite to the third side of the lower patch 300 with the center point of the lower patch 300 interposed therebetween, and the fourth lower groove 380 is disposed opposite to the third lower groove 360 with the center point of the lower patch 300.

Here, the first feed hole 420, the second feed hole 440, and the third feed hole 460 overlap each other as the dielectric 100, the upper patch 200, and the lower patch 300 are stacked, so the feed hole 400 through which the feed pin penetrates is formed.

Referring to FIG. 5, as the dielectric 100, the upper patch 200, and the lower patch 300 are stacked, the lightweight patch antenna includes a first lightweight groove 520, a second lightweight groove 540, a third lightweight groove, and a fourth lightweight groove.

The first lightweight groove 520 is formed by removing a portion of the lightweight patch antenna. In this case, as the dielectric 100, the upper patch 200, and the lower patch 300 are stacked, the first dielectric groove 120, the first upper groove 220, and the first lower groove 320 overlap to form the first lightweight groove 520. The first lightweight groove 520 has a shape recessed from the first side of the lightweight patch antenna toward the inside of the lightweight patch antenna (or toward the center point).

The second lightweight groove 540 is formed by removing a portion of the lightweight patch antenna. In this case, as the dielectric 100, the upper patch 200, and the lower patch 300 are stacked, the second dielectric groove 140, the second upper groove 240, and the second lower groove 340 overlap to form the second lightweight groove 540. The second lightweight groove 540 has a shape recessed from the second side of the lightweight patch antenna toward the inside of the lightweight patch antenna (or toward the center point).

Since the second side is a side opposite to the first side with the center point of the lightweight patch antenna interposed therebetween, the first lightweight groove 520 and the second lightweight groove 540 are disposed opposite to each other with the center point of the lightweight patch antenna interposed therebetween.

The third lightweight groove 560 is formed by removing a portion of the lightweight patch antenna. In this case, as the dielectric 100, the upper patch 200, and the lower patch 300 are stacked, the third dielectric groove 160, the third upper groove 260, and the third lower groove 360 overlap to form the third lightweight groove 560. The third lightweight groove 560 has a shape recessed from the third side of the lightweight patch antenna toward the inside of the lightweight patch antenna (or toward the center point).

The fourth lightweight groove is formed by removing a portion of the lightweight patch antenna. In this case, as the dielectric 100, the upper patch 200, and the lower patch 300 are stacked, the fourth dielectric groove 180, the fourth upper groove 280, and the fourth lower groove 380 overlap to form the fourth dielectric groove. The fourth lightweight groove has a shape recessed from the fourth side of the lightweight patch antenna toward the inside of the lightweight patch antenna (or toward the center point).

Since the fourth side is a side opposite to the third side with the center point of the lightweight patch antenna interposed therebetween, the third lightweight groove 560 and the fourth lightweight groove are disposed opposite to each other with the center point of the lightweight patch antenna interposed therebetween.

Referring to FIG. 6, a length of the side of the dielectric 100 and a major axis LS length of the lightweight groove are formed to have a ratio of about 25 to 8, and a length of the side of the dielectric 100 and a minor axis SS length of the lightweight groove is formed to have a ratio of about 5 to 1. Accordingly, the lightweight groove is formed to have a ratio of about 8 to 5 between the major axis LS and the minor axis SS. In this case, the ratio of the lengths of the dielectric 100 and the lightweight groove means the ratio between a length of a side S1 parallel to the major axis LS of the lightweight groove and a length of the major axis LS of the lightweight groove among the plurality of sides constituting the dielectric 100, and means the ratio between a length of a side S2 parallel to the minor axis SS of the lightweight groove and the minor axis length of the lightweight groove among the plurality of sides constituting the dielectric 100.

As an example, referring to FIG. 7, when horizontal and vertical lengths of the dielectric 100 are approximately 25 mm, the major axis LS of the first lightweight groove 520 has a length of approximately 8 mm, and the minor axis SS of the first lightweight groove 520 has a length of approximately 5 mm.

As such, the lightweight patch antenna includes the first lightweight groove 520 to the fourth lightweight groove in the form in which a portion of the patch antenna is removed by stacking the dielectric 100, the upper patch 200, and the lower patch 300 in which the groove is formed to reduce the weight by about 20% to 30% compared to the conventional patch antenna, thereby providing the lightweight patch antenna.

In the above, the example in which four lightweight grooves are formed on a lightweight patch antenna for lightweight has been described, but the present disclosure is not limited thereto and the lightweight patch antenna may be configured to include a pair of lightweight grooves disposed opposite to each other with the center point of the lightweight patch antenna interposed therebetween.

As an example, referring to FIGS. 8 and 9, the lightweight patch antenna 540 includes the first lightweight groove 520 and the second lightweight groove 540.

The first lightweight groove 520 is formed by removing a portion of the lightweight patch antenna. In this case, as the dielectric 100, the upper patch 200, and the lower patch 300 are stacked, the first dielectric groove 120, the first upper groove 220, and the first lower groove 320 overlap to form the first lightweight groove 520. The first lightweight groove 520 has a shape recessed from the first side of the lightweight patch antenna toward the inside of the lightweight patch antenna (or toward the center point).

The second lightweight groove 540 is formed by removing a portion of the lightweight patch antenna. In this case, as the dielectric 100, the upper patch 200, and the lower patch 300 are stacked, the second dielectric groove 140, the second upper groove 240, and the second lower groove 340 overlap to form the second lightweight groove 540. The second lightweight groove 540 has a shape recessed from the second side of the lightweight patch antenna toward the inside of the lightweight patch antenna (or toward the center point).

Since the second side is a side opposite to the first side with the center point of the lightweight patch antenna interposed therebetween, the first lightweight groove 520 and the second lightweight groove 540 are disposed opposite to each other with the center point of the lightweight patch antenna interposed therebetween.

Here, in FIGS. 8 and 9, the lightweight patch antenna in which the first lightweight groove 520 and the second lightweight groove 540 are formed has been described by way of example, but the present disclosure is not limited thereto, and the lightweight patch antenna may include the third lightweight groove 560 and the fourth lightweight groove.

The lightweight patch antenna may be configured to include three lightweight grooves, including a pair of lightweight grooves disposed opposite to each other with the center point of the lightweight patch antenna interposed therebetween and another lightweight groove.

As an example, referring to FIGS. 10 and 11, the lightweight patch antenna includes the first lightweight groove 520, the second lightweight groove 540, and the third lightweight groove 560.

The first lightweight groove 520 is formed by removing a portion of the lightweight patch antenna. In this case, as the dielectric 100, the upper patch 200, and the lower patch 300 are stacked, the first dielectric groove 120, the first upper groove 220, and the first lower groove 320 overlap to form the first lightweight groove 520. The first lightweight groove 520 has a shape recessed from the first side of the lightweight patch antenna toward the inside of the lightweight patch antenna (or toward the center point).

The second lightweight groove 540 is formed by removing a portion of the lightweight patch antenna. In this case, as the dielectric 100, the upper patch 200, and the lower patch 300 are stacked, the second dielectric groove 140, the second upper groove 240, and the second lower groove 340 overlap to form the second lightweight groove 540. The second lightweight groove 540 has a shape recessed from the second side of the lightweight patch antenna toward the inside of the lightweight patch antenna (or toward the center point).

Since the second side is a side opposite to the first side with the center point of the lightweight patch antenna interposed therebetween, the first lightweight groove 520 and the second lightweight groove 540 are disposed opposite to each other with the center point of the lightweight patch antenna interposed therebetween.

The third lightweight groove 560 is formed by removing a portion of the lightweight patch antenna. In this case, as the dielectric 100, the upper patch 200, and the lower patch 300 are stacked, the third dielectric groove 160, the third upper groove 260, and the third lower groove 360 overlap to form the third lightweight groove 560. The third lightweight groove 560 has a shape recessed from the third side of the lightweight patch antenna toward the inside of the lightweight patch antenna (or toward the center point).

Here, in FIGS. 10 and 11, the lightweight patch antenna in which the first lightweight groove 520, the second lightweight groove 540, and the third lightweight groove 560 are formed has been described by way of example, but the present disclosure is not limited thereto, and the lightweight patch antenna may include the first lightweight groove 520, the second lightweight groove 540, and the fourth lightweight groove, include the first lightweight groove 520, the third lightweight groove 560, and the fourth lightweight groove, or include the second lightweight groove 540, the third lightweight groove 560, and the fourth lightweight groove.

As such, the lightweight patch antenna according to the embodiment of the present disclosure includes a pair of lightweight grooves disposed opposite to each other with the center point interposed therebetween, and lightweight grooves may be additionally formed according to the weight required by the mounted device.

The lightweight patch antenna may be provided with lightweight grooves of various shapes. In this case, the lightweight groove may be formed in various shapes such as a round rectangle, a circle, and an ellipse. Here, the shape of the lightweight groove is the shape when viewing the lightweight patch antenna from the top (or bottom).

As an example, referring to FIGS. 12 and 13, the lightweight patch antenna may be formed with a lightweight groove in the shape of the round rectangle. The dielectric 100 groove, the upper groove, and the lower groove are formed in a rectangular shape having four vertices. In this case, the dielectric 100 groove, the upper groove, and the lower groove are formed in the round rectangle shape with two vertices disposed in the direction of the center point of the lightweight patch antenna formed in an arc shape. As the dielectric 100, the upper patch 200, and the lower patch 300 are stacked to form a lightweight patch antenna, the first lightweight groove 520 to the fourth lightweight groove are formed in the round rectangular shape.

As another example, referring to FIGS. 14 and 15, the lightweight patch antenna may include an elliptical (circular) lightweight groove. The dielectric 100 groove, the upper groove, and the lower groove are formed in a semi-elliptical (semi-circular) shape having about half of an elliptical (circular) shape. As the dielectric 100, the upper patch 200, and the lower patch 300 are stacked to form the lightweight patch antenna, the first lightweight groove 520 to the fourth lightweight groove are formed in the semi-elliptical or semi-circular shape.

Corners of the lightweight patch antenna may be formed with lightweight grooves. For example, referring to FIGS. 16 and 17, the first dielectric groove 120 is formed by partially removing corners of the first and fourth sides of the dielectric 100, and the second dielectric groove 140 is formed by partially removing the corners of the second and third sides. The third dielectric groove 160 is formed by partially removing the corners of the first and second sides of the dielectric 100, and the fourth dielectric groove 180 is formed by partially removing the corners of the third and fourth sides of the dielectric 100.

The first upper groove 220 is formed by partially removing the corners of the first and fourth sides of the upper patch 200, and the second upper groove 240 is formed by partially removing the corners of the second and third sides of the upper patch 200. The third upper groove 260 is formed by partially removing the corners of the first and second sides of the upper patch 200, and the fourth upper groove 280 is formed by partially removing the corners of the third and fourth sides of the upper patch 200.

The first lower groove 320 is formed by partially removing the corners of the first and fourth sides of the lower patch 300, and the second lower groove 340 is formed by partially removing the corners of the second and third sides of the lower patch 300. The third lower groove 360 is formed by partially removing the corners of the first and second sides of the lower patch 300, and the fourth lower groove 380 is formed by partially removing the corners of the third and fourth sides of the lower patch 300.

As the dielectric 100, the upper patch 200, and the lower patch 300 are stacked to form the lightweight patch antenna, the lightweight patch antenna has four corners partially removed to form a plus sign shape.

In this case, it is assumed that the lightweight patch antenna has a first side corresponding to the first sides of the dielectric 100, the upper patch 200, and the lower patch 300, a second side corresponding to the second sides of the dielectric 100, the upper patch 200, and the lower patch 300, a third side corresponding to the third sides of the dielectric 100, the upper patch 200, and the lower patch 300, and a fourth side corresponding to the fourth sides of the dielectric 100, the upper patch 200, and the lower patch 300.

In this case, the first lightweight groove 520 is formed by partially removing the corners of the first and fourth sides of the lightweight patch antenna, and the second lightweight groove 540 is formed by partially removing the corners of the second and third sides of the lightweight patch antenna. The third lightweight groove 560 is formed by partially removing the corners of the first and second sides of the lightweight patch antenna, and the fourth lightweight groove is formed by partially removing the corners of the third and fourth sides of the lightweight patch antenna.

Accordingly, the first lightweight groove 520 and the second lightweight groove 540 are disposed opposite to each other with the center point of the lightweight patch antenna interposed therebetween, and the third lightweight groove 560 and the fourth lightweight groove are disposed opposite to each other with the center of the lightweight patch antenna interposed therebetween.

As such, the lightweight patch antenna includes the first lightweight groove 520 to the fourth lightweight groove in the form in which a portion of the patch antenna is removed by stacking the dielectric 100, the upper patch 200, and the lower patch 300 in which the groove is formed to reduce the weight by about 20% to 30% compared to the conventional patch antenna, thereby providing the lightweight patch antenna.

FIG. 18 illustrates data obtained by measuring return loss and gain zenith of the conventional patch antenna without the lightweight groove and the lightweight patch antenna according to an embodiment of the present disclosure. In this case, the return loss and gain zenith illustrated in FIG. 18 are average values repeatedly measured several times in 1575 MHz and 1602 MHz which are main frequency bands of GPS and GNSS.

In terms of the return loss, the lightweight patch antenna is approximately 0.16 larger than the conventional patch antenna in the 1575 MHz frequency band and approximately 1.56 smaller than the conventional patch antenna in the 1602 MHz frequency band. In general, when the return loss is greater than 10 dB, the effect on the performance of the antenna is insignificant even if the value is increased, so it can be seen that the lightweight patch antenna has the same level of return loss characteristics as the conventional patch antenna.

In terms of the gain zenith, the lightweight patch antenna is approximately 1.08 smaller than the conventional patch antenna in the 1575 MHz frequency band and approximately 1.12 smaller than the conventional patch antenna in the 1602 MHz frequency band. In general, when the gain zenith is −3 dBic or greater, the lightweight patch antenna may be used as the GPS or GNSS satellite antenna, so it can be seen that the lightweight patch antenna has slightly lower gain zenith than the conventional patch antenna, but is sufficient for use as a satellite antenna.

Although the preferred embodiments according to the present disclosure have been described above, modifications can be made in various forms, and it is understood that those skilled in the art can make various modifications and variations without departing from the scope of the claims of the present disclosure.

The invention claimed is:

1. A lightweight patch antenna, comprising:
- a dielectric formed with a plurality of dielectric grooves;
- an upper patch that is disposed on the dielectric and has an upper groove formed at a position overlapping the dielectric groove; and
- a lower patch that is disposed under the dielectric and has a lower groove formed at a position overlapping the dielectric groove,
- wherein the dielectric includes:
- a first dielectric groove that is formed on a first side of the dielectric:
- a second dielectric groove that is formed on a second side of the dielectric and disposed opposite to the first dielectric groove with a center point of the dielectric interposed therebetween; and
- a third dielectric groove that is formed on a third side of the dielectric.

2. The lightweight patch antenna of claim 1, wherein the dielectric further includes a fourth dielectric groove that is formed on a fourth side of the dielectric and disposed opposite to the third dielectric groove with the center point of the dielectric interposed therebetween.

3. The lightweight patch antenna of claim 1, wherein the plurality of dielectric grooves has a shape recessed from an outer circumference of the dielectric toward the center point of the dielectric.

4. The lightweight patch antenna of claim 1, wherein the upper patch includes:
- a first upper groove that is formed on a first side of the upper patch and overlaps a first dielectric groove formed in the dielectric; and
- a second upper groove that is formed on a second side of the upper patch, disposed opposite to the first upper groove with a center point of the upper patch interposed therebetween, and overlaps a second dielectric groove formed in the dielectric.

5. The lightweight patch antenna of claim 4, wherein the upper patch further includes a third upper groove that is formed on a third side of the upper patch and overlaps a third dielectric groove formed in the dielectric.

6. The lightweight patch antenna of claim 5, wherein the upper patch further includes a fourth upper groove that is formed on a fourth side of the upper patch, disposed opposite to the third upper groove with the center point of the upper patch interposed therebetween, and overlaps a fourth dielectric groove formed in the dielectric.

7. The lightweight patch antenna of claim 1, wherein the upper groove has a shape recessed from an outer circumference of the upper patch toward a center point of the upper patch.

8. The lightweight patch antenna of claim 1, wherein the lower patch includes:
- a first lower groove that is formed on a first side of the lower patch and overlaps a first dielectric groove formed in the dielectric; and
- a second lower groove that is formed on a second side of the lower patch, disposed opposite to the first lower groove with a center point of the upper patch interposed therebetween, and overlaps a second dielectric groove formed in the dielectric.

9. The lightweight patch antenna of claim 8, wherein the lower patch further includes a third upper groove that is formed on a third side of the lower patch and overlaps a third dielectric groove formed in the dielectric.

10. The lightweight patch antenna of claim 9, wherein the lower patch further includes a fourth lower groove that is formed on a fourth side of the lower patch, disposed opposite to the third lower groove with the center point of the lower patch interposed therebetween, and overlaps a fourth dielectric groove formed in the dielectric.

11. The lightweight patch antenna of claim 1, wherein the lower groove has a shape recessed from the outer circumference of the lower patch toward the center point of the lower patch.

12. The lightweight patch antenna of claim 1, wherein the dielectric groove, the upper groove and the lower groove overlap to form a lightweight groove.

13. The lightweight patch antenna of claim 12, wherein the lightweight groove is formed from the outer circumference of the stack toward the center point of the stack.

14. The lightweight patch antenna of claim 12, wherein the lightweight groove comprises:
- a first lightweight groove that is formed on a first side of a stack; and
- a second lightweight groove that is formed on a second side of the stack opposite to the first side and disposed opposite to the first lightweight groove.

15. The lightweight patch antenna of claim 14, wherein the lightweight groove further comprises a third lightweight groove that is formed on a third side of the stack, both ends of which are connected to first ends of the first side and the second side, respectively.

16. The lightweight patch antenna of claim 15, wherein the lightweight groove further comprises a fourth lightweight groove that is formed on a fourth side of the stack opposite to the third side and disposed opposite to the third lightweight groove.

17. The lightweight patch antenna of claim 12, wherein a ratio of a major axis length of the lightweight groove and a minor axis length of the lightweight groove is 8:5.

18. The lightweight patch antenna of claim 12, wherein a ratio of a length of a side of a stack parallel to a major axis of the lightweight groove and a major axis length of the lightweight groove is 25:8, and a ratio of a length of a side of a stack parallel to the minor axis of the lightweight groove and a minor axis length of the lightweight groove is 5:1.

* * * * *